(12) United States Patent
Sanderson

(10) Patent No.: US 8,612,994 B1
(45) Date of Patent: Dec. 17, 2013

(54) METHODS AND SYSTEMS FOR ACTIVATING AND DEACTIVATING VIRTUALIZATION LAYERS

(75) Inventor: Jordan Sanderson, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 952 days.

(21) Appl. No.: 12/414,170

(22) Filed: Mar. 30, 2009

(51) Int. Cl.
*G06F 13/00* (2006.01)

(52) U.S. Cl.
USPC ............ 719/313; 718/100; 709/202; 707/705

(58) Field of Classification Search
USPC ............ 719/313; 718/100; 709/202; 707/705
See application file for complete search history.

(56) References Cited

U.S. PATENT DOCUMENTS

| | | | |
|---|---|---|---|
| 7,117,495 B2 * | 10/2006 | Blaser et al. ................. | 717/174 |
| 7,162,724 B2 | 1/2007 | Blaser et al. | |
| 7,165,260 B2 | 1/2007 | Blaser et al. | |
| 7,461,086 B1 | 12/2008 | Hurren et al. | |
| 7,461,096 B1 | 12/2008 | Hurren et al. | |
| 7,496,931 B2 | 2/2009 | Cook et al. | |
| 7,512,977 B2 | 3/2009 | Cook et al. | |
| 7,519,963 B1 | 4/2009 | Blaser et al. | |
| 7,542,988 B1 | 6/2009 | Cook et al. | |
| 7,549,164 B2 | 6/2009 | Cook et al. | |
| 7,620,956 B2 | 11/2009 | Cook et al. | |
| 7,877,413 B1 | 1/2011 | Cook et al. | |
| 7,886,291 B1 | 2/2011 | Jones et al. | |
| 7,945,897 B1 | 5/2011 | Cook | |
| 7,970,789 B1 | 6/2011 | Blaser et al. | |
| 8,010,961 B1 | 8/2011 | Cook et al. | |
| 8,060,940 B2 | 11/2011 | McCorkendale et al. | |
| 8,108,346 B1 | 1/2012 | Hurren et al. | |
| 8,112,392 B1 | 2/2012 | Bunnell et al. | |
| 8,112,767 B1 | 2/2012 | Cook | |
| 2005/0091658 A1 * | 4/2005 | Kavalam et al. ............... | 718/104 |
| 2006/0259949 A1 * | 11/2006 | Schaefer et al. .................. | 726/1 |
| 2007/0180450 A1 | 8/2007 | Croft et al. | |
| 2009/0007151 A1 * | 1/2009 | Sheehan et al. ............... | 719/321 |
| 2009/0249051 A1 * | 10/2009 | TeNgaio et al. .................... | 713/1 |
| 2010/0023934 A1 * | 1/2010 | Sheehan et al. ............... | 717/168 |
| 2010/0064340 A1 * | 3/2010 | McCorkendale et al. ........ | 726/1 |
| 2011/0010756 A1 * | 1/2011 | Choi et al. ......................... | 726/2 |
| 2011/0061045 A1 | 3/2011 | Phillips | |
| 2011/0145806 A1 * | 6/2011 | Cook ........................... | 717/170 |

OTHER PUBLICATIONS

Jared Blaser; Process Tracking Application Layered System; U.S. Appl. No. 11/324,571, filed Jan. 3, 2006.
Randall Cook; Dynamic Insertion and Removal of Virtual Software Sub-Layers; U.S. Appl. No. 12/058,782, filed Mar. 31, 2008.
Karl Bunnell et al.; Methods and Systems for Merging Virtualization Sublayers; U.S. Appl. No. 12/396,969, filed Mar. 3, 2009.
Lance TeNgaio; Distributed Application Virtualization; U.S. Appl. No. 12/142,549, filed Jun. 19, 2008.

(Continued)

*Primary Examiner* — Andy Ho

(74) *Attorney, Agent, or Firm* — ALG Intellectual Property, LLC

(57) ABSTRACT

A computer-implemented method may include identifying an action associated with a software program. The computer-implemented method may also include determining that the software program is located in a virtualization layer. The computer-implemented method may further include changing an activation state of the virtualization layer in response to the action. Various other methods, systems, and computer-readable media are also disclosed.

20 Claims, 10 Drawing Sheets

(56) References Cited

OTHER PUBLICATIONS

Jeremy Hurren; Feature Based Software Virtualization; U.S. Appl. No. 11/960,706, filed Dec. 20, 2007.

Karl Bunnell et al.; Methods and Systems for Creating and Applying Patches for Virtualized Applications; U.S. Appl. No. 12/369,512, filed Feb. 11, 2009.

Randall Cook; Automatic Virtualization Based on User-Defined Criteria; U.S. Appl. No. 12/024,079, filed Jan. 31, 2008.

* cited by examiner

METHODS AND SYSTEMS FOR ACTIVATING AND DEACTIVATING VIRTUALIZATION LAYERS

BACKGROUND

Information Technology (IT) administrators may spend a substantial amount of time managing software applications. Managing software applications may include resolving application conflicts, repairing damaged applications, migrating to new versions of applications, installing applications, and patching applications. These tasks may be frustrating and time consuming.

Application virtualization technologies may simplify many IT administration tasks. For example, application virtualization may allow an administrator to turn on or off a user's access to applications and data, which may reduce the time it takes to provide users with the resources they need. Application virtualization may also allow an administrator to reset broken applications to a known-good state without fear of damaging other applications. Application virtualization may ensure that each virtualized application has its own copy of DLL files that it would normally share with other applications. This eliminates conflicts that occur when two or more applications may require different versions of the same DLL, thereby rescuing administrators from a condition commonly referred to as "DLL hell."

Application virtualization may allow different versions of the same application to peacefully coexist. Among other things, this means that an administrator may keep older versions intact and available while testing new versions. Even after migrating to a new version, an administrator may quickly rollback to the previous version at any time. Another advantage of some traditional virtualization technologies is the ability to deactivate a virtualization layer to conserve system resources. Unfortunately, managing multiple virtualization layers may be cumbersome. For example, a user may not remember to deactivate a virtualization layer or may not have time to deactivate a virtualization layer that is not in use. Furthermore, it may be time consuming for a user to activate a virtualization layer each time the user needs to access a program installed in the virtualization layer.

SUMMARY

Embodiments of the instant disclosure may provide methods and systems for activating and deactivating virtualization layers on an as-needed basis. For example, a layer-management module may automatically activate a virtualization layer when a software program installed in the virtualization layer is needed to access a system resource (e.g., a file). The layer-management module may also deactivate a virtualization layer when a software program in the virtualization layer is no longer in use. Activating and deactivating virtualization layers may be referred to herein as changing activation states of virtualization layers.

Generally, a layer-management module may identify an action associated with a software program, determine that the software program is located in a virtualization layer, and change the activation state of the virtualization layer in response to the action. In some embodiments, identifying the action may include identifying a request to access the software program and/or a file or other resource associated with the software program. In other embodiments, identifying the action associated with the software program may include identifying an attempt to close the software program, identifying an attempt to close a computer resource, and/or identifying termination of a process associated with the software program.

In some embodiments, the action associated with the software program may include an attempt to open a file. The software program may be configured to open the file, and the layer-management module may determine that a file type of the file (e.g., a MIME type) is in a file-association list that identifies the file type as a file type that may be accessed by the software program installed in the virtualization layer. The virtualization layer may be activated to allow the file to be accessed by the software program. The virtualization layer may be deactivated when the software program is no longer in use. In some embodiments, after the virtualization layer is deactivated, the layer-management module may cause an icon associated with the software program to continue to be displayed for the file associated with the software program. The instant disclosure may also include various other embodiments, alternatives, and examples for activating and deactivating virtualization layers.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
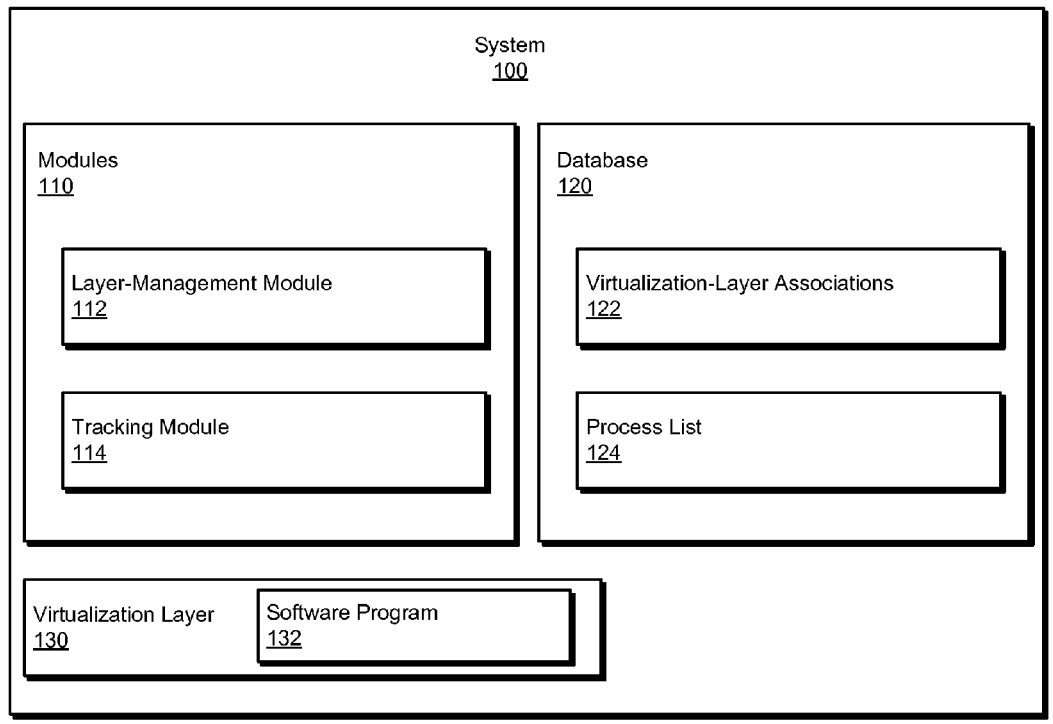
FIG. 1 is a block diagram of an exemplary system for activating and deactivating virtualization layers according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
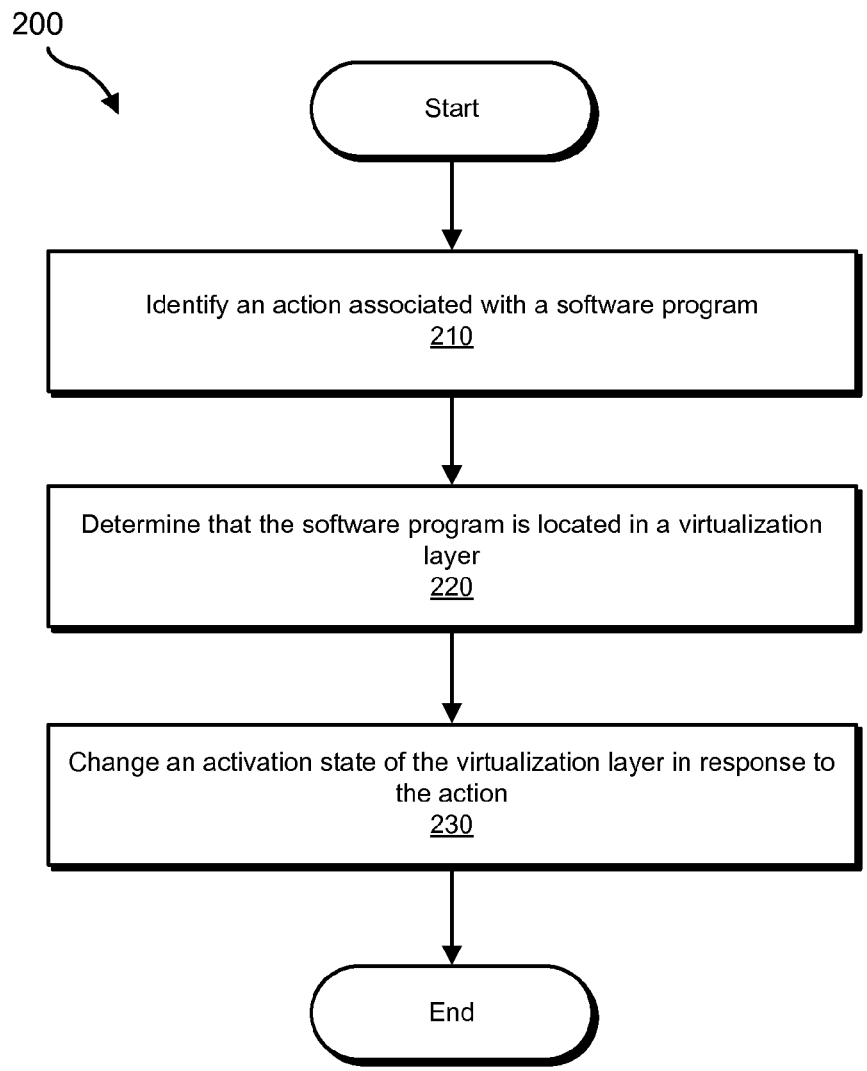
FIG. 2 is a flow diagram of an exemplary method for activating and deactivating virtualized applications according to certain embodiments.
Figure 3:
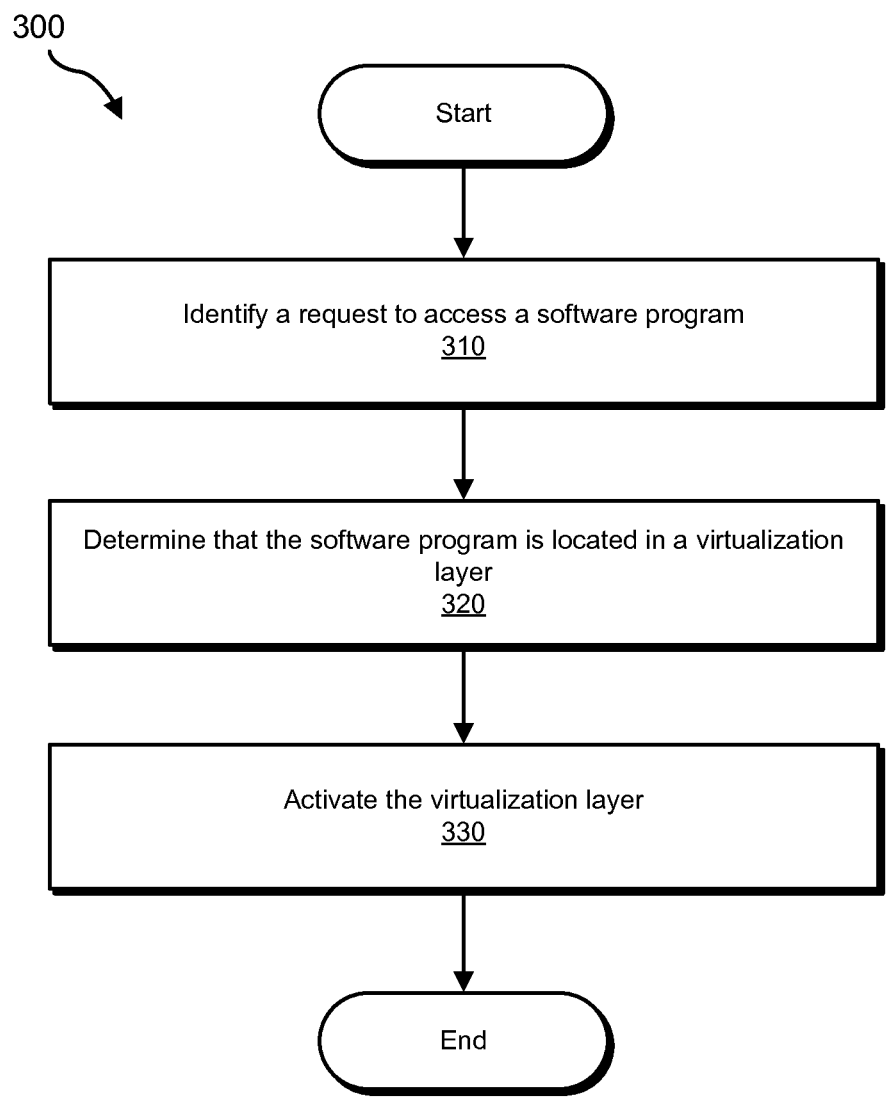
FIG. 3 is a flow diagram of an exemplary method for activating virtualization layers according to certain embodiments.
Figure 4:
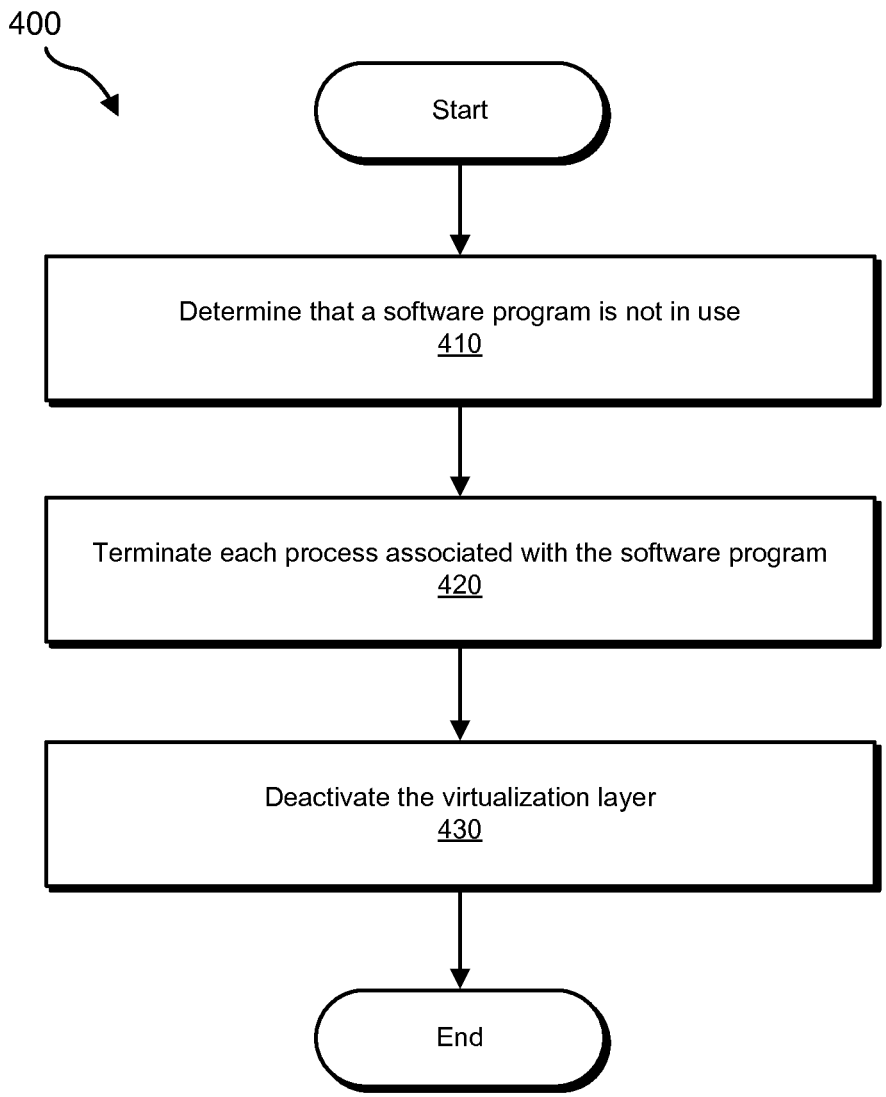
FIG. 4 is a flow diagram of an exemplary method for deactivating virtualization layers according to certain embodiments.
Figure 9:
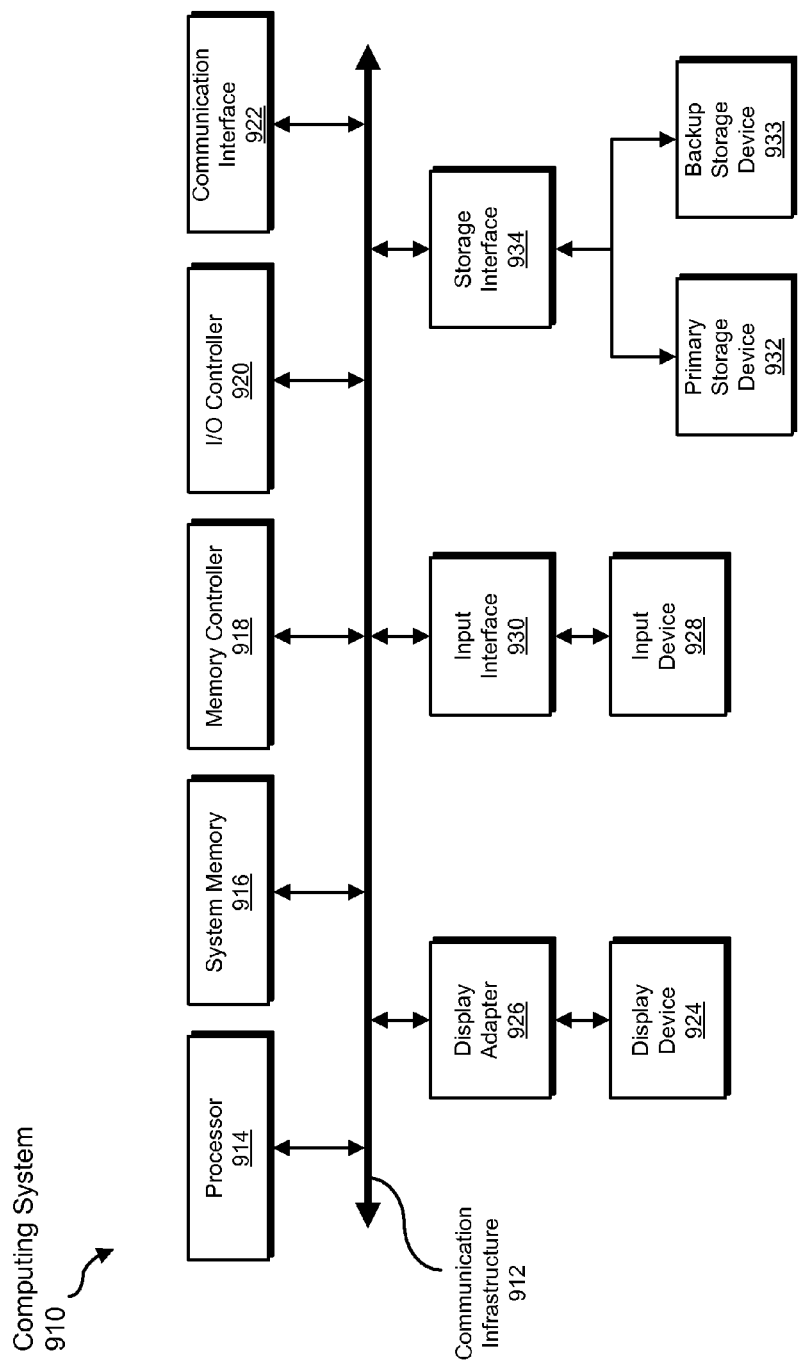
FIG. 9 is a block diagram of an exemplary computing system capable of implementing one or more of the embodiments described and/or illustrated herein.
Figure 10:
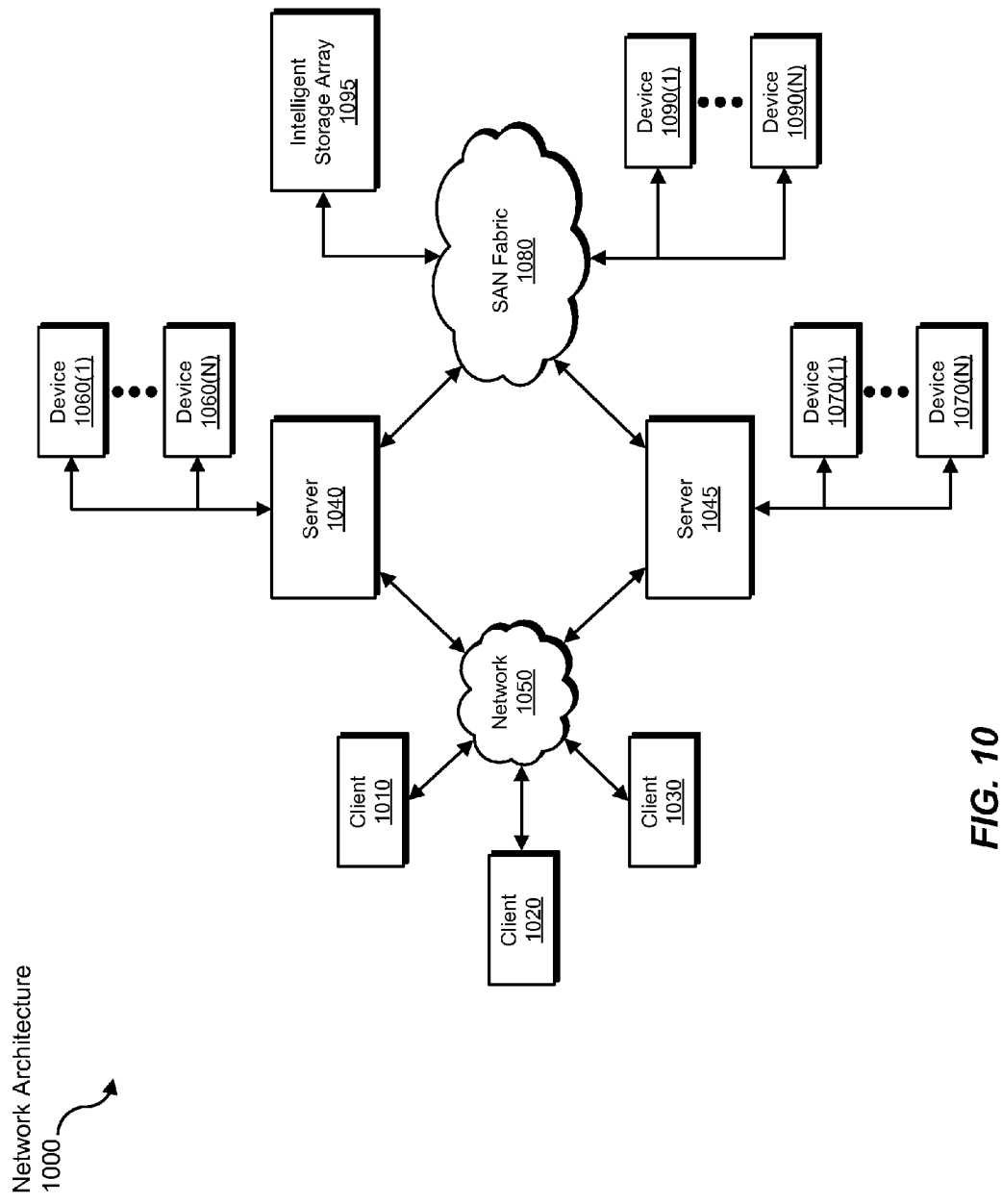
FIG. 10 is a block diagram of an exemplary computing network capable of implementing one or more of the embodiments described and/or illustrated herein.

Embodiments of the present disclosure provide methods and systems for activating and deactivating virtualization layers on an as-needed basis. For example, a layer-management module may identify an action associated with a software program, determine that the software program is located in a virtualization layer, and change an activation state of the virtualization layer in response to the action. FIG. 1 shows an exemplary system for activating and deactivating virtualization layers, and FIGS. 2-4 show methods for accomplishing the same. FIGS. 5-8 show exemplary application-layering technologies, and FIGS. 9 and 10 illustrate an exemplary computing system and network architecture for implementing embodiments of the instant disclosure.

FIG. 1 illustrates an exemplary layering computing system 100 for activating and/or deactivating virtualization layers. System 100 may include modules 110, a database 120, and a virtualization layer 130. Modules 110 may include a layer-management module 112 and a tracking module 114. Layer-management module 112 may be programmed to identify an action associated with a software program, determine that the software program is located in a virtualization layer, and change an activation state of the virtualization layer in response to the action. Tracking module 114 may be programmed to track a process associated with the software program, determine that the software program is no longer in use, and/or terminate the process associated with the software program.

In certain embodiments, one or more modules shown in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 910 in FIG. 9 and/or portions of exemplary network architecture 1000 in FIG. 10. One or more of modules 110 in FIG. 1 may also represent all or portions of one or more special-purpose computers configured to perform one or more tasks associated with steps disclosed herein.

As previously mentioned, system 100 may also include a database 120. Database 120 may represent a portion of one or more computing devices. Database 120 may represent a portion of computing system 910 in FIG. 9 and/or portions of exemplary network architecture 1000 in FIG. 10. Database 120 may include any data structure capable of storing and/or organizing virtualization-layer associations and processes.

Database 120 may store virtualization-layer associations 122, which may associate file types and/or actions with one or more virtualization layers. For example, virtualization-layer associations 122 may include a list of file types associated with virtualization layer 130. A file type may be associated with a virtualization layer if one or more software programs installed in the virtualization layer are programmed to enable use of a file of the file type. A list of file types may include one or more file types associated with a virtualization layer.

Virtualization-layer associations 122 may include one or more lists that identifies one or more software programs associated with one or more virtualization layers. A software program may be identified in a list associated with a virtualization layer when the virtualization layer includes the software program.

Virtualization-layer associations 122 may also include one or more lists of actions associated with one or more virtualization layers. An action may be associated with a virtualization layer when a software application stored in the virtualization layer is capable of performing the action and/or enabling performance of the action. For example, the action may include an attempt to access a network, and a network agent may enable access to the network. If the network agent is installed in virtualization layer 130, virtualization-layer associations 122 may associate attempts to access the network with virtualization layer 130. The discussions corresponding to FIGS. 3 and 4 provide additional examples of virtualization-layer associations.

In addition to virtualization-layer associations 122, database 120 may include a process list 124. Process list 124 may include identify one or more processes that are associated with one or more software programs installed on one or more virtualization layers. Tracking module 114 may create and/or use process list 124 to track processes associated with virtualization layers. If a virtualization layer is to be deactivated, tracking module 114 may terminate one or more processes associated with the virtualization layer.

System 100 may include one or more virtualization layers, such as virtualization layer 130. A detailed discussion of virtualization layers is provided in FIGS. 5-8. Virtualization layer 130 may include a software program 132. Software program 132 may be installed on virtualization layer 130. Software program 132 may include any software application, software driver, software agent, and/or other computer-executable code that may be included in a virtualization layer.

FIG. 2 shows an exemplary method 200 for activating and deactivating virtualization layers. The steps shown in FIG. 2 may be performed by any suitable computer-executable code and/or computing system. For example, layer-management module 112 may identify an action associated with software program 132 (step 210). Layer-management module 112 may identify various types of actions associated with software program 132. For example, layer-management module 112 may identify an action associated with software program 132 by identifying an attempt to access a resource associated with software program 132. Identifying an action associated with software program 132 may also include identifying a request or attempt to open software program 132. The discussion corresponding to FIG. 3 provides examples of identifying requests to access and/or open software programs and resources associated with software programs.

In some embodiments, identifying an action associated with a software program may include determining that the software program is not being used or is no longer needed. In such embodiments, layer-management module 112 may identify an action associated with the software program by identifying an attempt to close the software program, identifying an attempt to close a computer resource, and/or identifying the termination of a process associated with the software program. Examples of determining that a software program is not in use are provided in the discussion corresponding to FIG. 4.

After identifying the action associated with software program 132, layer-management module 112 may determine that software program 132 is located in virtualization layer 130 (step 220). In some embodiments, layer-management module 112 may determine that software program 132 is located in virtualization layer 130 by determining that the action associated with the software program is identified in virtualization-layer associations 122. For example, if the action is an attempt to open a file having a first file type, layer-management module 112 may determine that virtualization-layer associations 122 associates the first file type with virtualization layer 130.

By associating the first file type with virtualization layer 130, virtualization-layer associations 122 indicates that virtualization layer 130 includes a software program (e.g. software program 132) capable of opening files having the first file type. Thus, by determining that virtualization-layer 130 is associated with the first file type, layer-management module 112 may determine that software program 132 is located in virtualization layer 130. In other words, by determining that virtualization-layer 130 is associated with the first file type, layer-management module 112 may determine that virtualization-layer 130 may need to be activated to allow the file of the first file type to be opened.

Once layer-management module 112 determines that software program 132 is located in virtualization layer 130, layer-management module 112 may change an activation state of virtualization layer 130 (step 230). By changing an activation state of virtualization layer 130, layer-management module 112 may transform a software program installed on virtualization layer 130 from an unusable software program to a usable software program.

Layer-management module 112 may change an activation state of virtualization layer 130 by activating and/or deactivating virtualization layer 130. For example, if the action associated with the software program is an attempt to open a file associated with software program 132, layer-management module 112 may activate virtualization layer 130 to enable software program 132 to open the file. In other embodiments, when the action is an action indicating that software program 132 is no longer being used, layer-management module 112 may change the activation state of virtualization layer 130 by deactivating virtualization layer 130.

FIG. 3 shows a method for activating a virtualization layer. The steps shown in FIG. 3 may be performed by any suitable computer-executable code and/or computing system. For example, layer-management module 112 may identify a request to access a software program (step 310). Identifying the request to access the software program may include identifying an attempt to access a computer resource associated with the software program. A computer resource may be associated with a software program when the software program enables use of the computer resource.

Examples of computer resources include files, network resources, input devices, output devices, and any other computer data, code, or hardware. A file may be associated with a software program if the software program is capable of opening, modifying, and/or printing the file. A network resource (e.g., a network interface or agent) may be associated with a software program if the software program enables use of the network resource. Similarly, an input device or output device may be associated with a software program (e.g., a device driver) if the software program enables use of the input or output device.

Identifying an attempt to access a computer resource may include identifying one or more actions. In some embodiments, identifying an attempt to access a computer resource may include identifying a request to open a file, identifying a request to print a file, and/or identifying a request to modify a file. For example, a user may attempt to open a file by clicking on the file. An operating system may search for a program capable of opening the file. For example, a WINDOWS operating system may check an HKEY_CLASSES_ROOT registry hive and/or an HKEY_CURRENT_USER registry hive to search for a file association that identifies a program capable of opening the file. Some operating systems (e.g., LINUX) may provide file associations using MIME type-based associations, and other operating systems (e.g., MAC OS) may use type codes and/or creator codes for file associations.

In some embodiments, if an operating system does not find a software program capable of opening the file, layer-management module 112 may receive the request to open the file and may determine whether a deactivated virtualization layer includes a program capable of opening the file. In other embodiments, layer-management module 112 may receive (e.g., intercept) the request to open the file before the operating system checks for file-system associations.

As another example of identifying an attempt to access a computer resource, layer-management module 112 may identify an attempt to use an output device (e.g., a printer, a display device, etc). In some embodiments, layer-management module 112 may receive a request to access the output device if an operating system cannot find a software program that enables use of the device. In other embodiments, layer-management module 112 may intercept a system call to use the output device before the operating system checks for software programs that enable use of the output device.

Returning to the method shown in FIG. 3, after identifying the request to access software program 132, layer-management module 112 may determine that software program 132 is located in virtualization layer 130 (step 320). In embodiments where the request to access a software program includes an attempt to access (e.g., open, close, or print) a file associated with the software program, layer-management module 112 may check virtualization-layer associations 122 to determine whether a deactivated layer includes a software program capable of accessing the file. Layer-management module 112 may check virtualization-layer associations 122 to determine whether a list of file types associated with a layer includes a file type of the file. For example, the request may include a user's attempt to open a MICROSOFT WORD file (e.g., .doc file) by clicking on the file. After the user clicks on the file, layer-management module 112 may check to see whether a ".doc" file type is listed in virtualization-layer associations 122. In some embodiments, layer-management module 112 may check virtualization-layer associations 122 after an operating system fails to find a software program to access the file. In other embodiments, layer-management module 112 may check virtualization-layer associations 122 before the operating system checks other file associations.

In embodiments where the request to access a software program includes an attempt to directly open a software program (e.g., when a user clicks on a shortcut whose target is the software program), layer-management module 112 may check a program list in virtualization-layer associations 122 to determine whether the software program is included in a virtualization layer. In embodiments where the request to access a software program includes an attempt to use a network resource, an input device, an output device, or other computer resource, layer-management module 112 may search virtualization-layer associations 122 to determine whether the action that caused the request is in an action list associated with a virtualization layer.

After layer-management module 112 determines that software program 132 is located in virtualization layer 130, layer-management module 112 may activate virtualization layer 130 (step 330). Virtualization layer 130 may be activated by making contents of virtualization layer 130 visible to an operating system and/or users. After virtualization layer 130 is activated, a software program installed on virtualization layer 130 may be available for use.

FIG. 4 shows an exemplary method for deactivating a virtualization layer. The steps shown in FIG. 4 may be performed by any suitable computer-executable code and/or computing system. For example, layer-management module 112 may determine that software program 132 is not in use (step 410). Layer-management module 112 may use any suitable mechanism to determine that software program 132 is not in use. For example, layer-management module 112 may identify an attempt to close software program 132, identify an attempt to close a computer resource associated with software program 132, and/or identify termination of a process associated with the software program. Additionally or alternatively, layer-management module 112 may determine that software program 132 is closed, determine that a resource associated with software program 132 is closed, and/or determine that a resource associated with software program 132 is no longer in use.

After determining that software program 132 is not in use, layer-management module 112 may terminate each process associated with software program 132 (step 420). Layer-management module 112 may track processes associated with virtualized software programs in process list 124 and may terminate each process listed for software program 132 in process list 124. Process list 124 may be updated each time a software program is opened and/or closed. For example, when a virtualization layer is activated and a software program is launched in the virtualization layer, layer-management module 112 may identify each process (including background processes) associated with the software program and save a list of the processes in process list 124. A process associated with a software program may include a process executing code of the software program.

By terminating each process associated with software application 132, layer-management module 112 may prepare virtualization layer 130 to be deactivated. In other embodiments, layer-management module 112 may not terminate any processes associated with software application 132. For example, layer-management module 112 may not terminate a process associated with software program 132 if only one process is associated with software program 132 and the process terminates when software program 132 is closed.

Layer-management module 112 may deactivate virtualization layer 130 after determining that software program 132 is not in use and/or after terminating each process associated with software application 132 (step 430). In some embodiments, layer-management module 112 may deactivate virtualization layer 130 by directing a file-system filter driver to deactivate virtualization layer 130. In other embodiments, layer-management module 112 may include a file-system filter driver (or other code capable of deactivating virtualization layers) and may deactivate virtualization layer 130 directly. A deactivated layer may only be visible to a file-system filter driver or other layer-management software. In some embodiments, a file-system filter driver may obscure a deactivated virtualization layer's existence so that the deactivated virtualization layer may not be visible to an underlying operating system. A software program installed on a virtualization layer that is deactivated may not be available for use until the virtualization layer is activated.

In traditional virtualization technologies, after a virtualization layer is deactivated, icons for files associated with software programs installed on the virtualization layer may revert to generic icons. For example, a WINAMP music player may be installed in a virtualization layer, and .mp3 and .wav files may be associated with (i.e., opened by) WINAMP. When the virtualization layer containing WINAMP is deactivated, icons for .mp3 and .wav files may change from WINAMP icons to generic icons.

To make application virtualization more transparent to users, embodiments of the present disclosure may cause file icons associated with a software program to persist even after a software application's virtualization layer is deactivated. Returning to the previous example, layer-management module 112 may cause WINAMP icons to be displayed for .mp3 and .wav files even when the virtualization layer containing WINAMP is deactivated.

Figure 5:
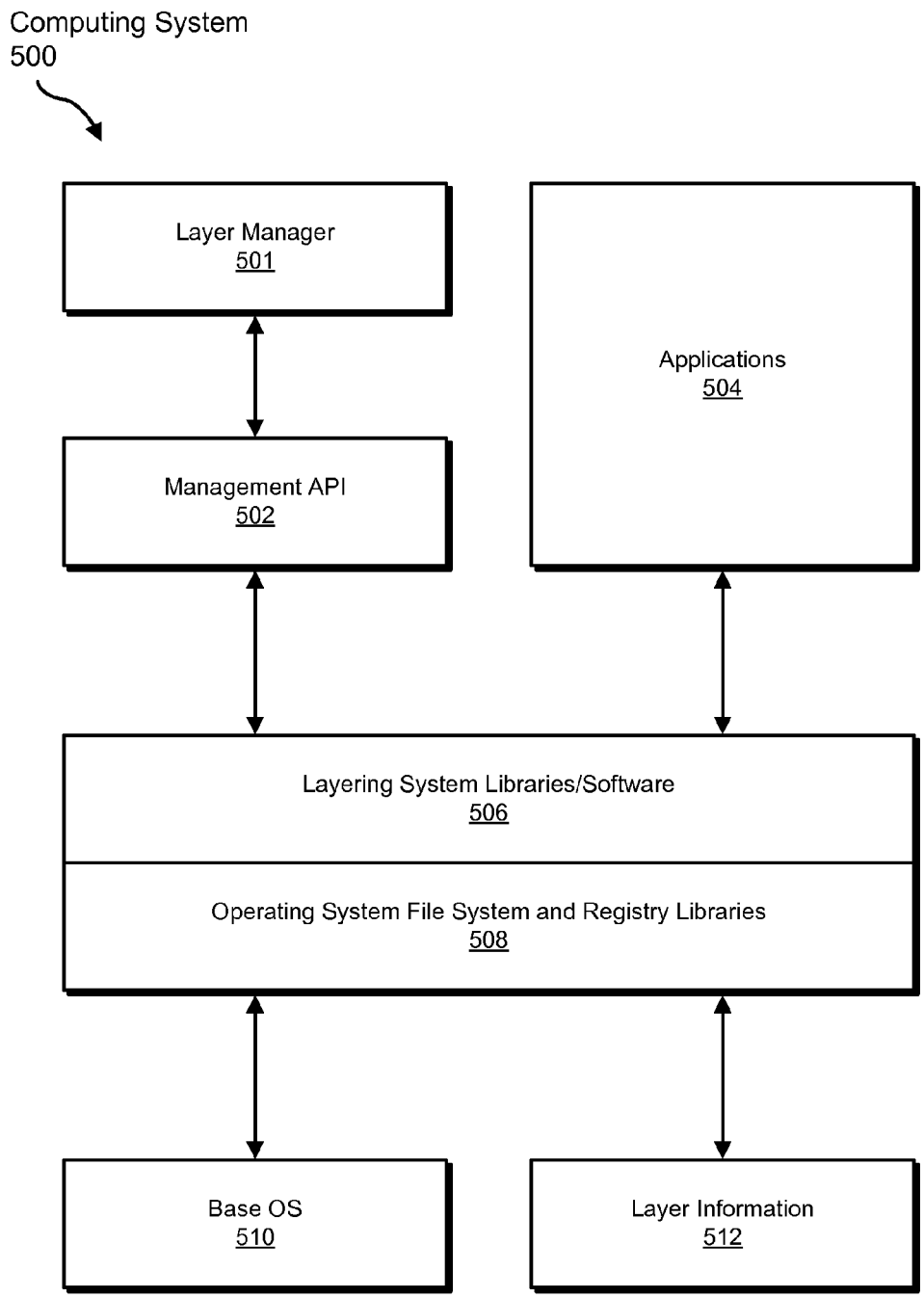
FIG. 5 is a block diagram of exemplary components of a conceptual level of a computing system configured to provide application virtualization according to certain embodiments.

FIGS. 5-8 provide examples of virtualization technologies and virtualized applications to which the virtualization layer activation and deactivation embodiments described herein may be applied. FIG. 5 shows a conceptual organization of components of a computing system 500 with a virtualization layer. A base operating system 510 may form a platform with which applications may be executed and from which files may be accessed in file systems. Base operating system 510 may include registry settings, which may be globally available to applications for reading and writing. Computing system 500 may include libraries 508 for executing the functions of the operating system. Libraries 508 may include operating system files and registry entries. Layering system libraries and software 506 may be tied to libraries 508. Layering system libraries and software 506 may interpret file system and registry accesses from applications 504. The layering system software 506 may perform computations to determine whether the access should be permitted to continue to base operating system 510 or should be redirected to layer information 512. Layer information 512 may include information relating to the contents of files and registry settings. Layer manager 501 may control configuration of layering system software 506 through a management Application Programming Interface (API) 502.

In some application-virtualization technologies, each virtualization layer may include two sublayers: a read-only sublayer and a writable sublayer. An example of a virtualization technology that utilizes read-only and read-write sublayers is SYMANTEC's WORKSPACE VIRTUALIZATION (SWV). A read-only sublayer may include an immutable base state of an application. In some embodiments, users may not—even unintentionally—make changes to the read-only sublayer. For example, in SWV and/or other virtualization technologies, only administrators may be able to edit, update, and/or delete the contents of read-only sublayers. An application may be reset by deleting the existing read-only sublayer and replacing it with a new read-only sublayer. A read-write (i.e., writeable) sublayer may capture changes to a base state of an application. For example, when a user alters an application by changing default preferences, these changes may be written to the read-write sublayer.

Virtualized applications that include read-only sublayers and read-write sublayers may be created in any suitable manner. For example, SWV and/or other virtualization technologies may allow a user to specify a setup program for an application the user wants to capture for purposes of virtualizing the application. SWV and/or other virtualization technologies may launch the setup program and capture all of the applications, files, and processes, including child processes and process-induced changes, in a single Virtual Software Package (VSP) or other virtual package. SWV and/or other virtualization technologies may also capture MICROSOFT installer (MSI) and service control manager changes. When the setup process is complete, SWV and/or other virtualization technologies may automatically stop the capture process.

An administrator may then edit the VSP or other virtual package to include settings that the administrator wants to distribute to users.

Figure 6:
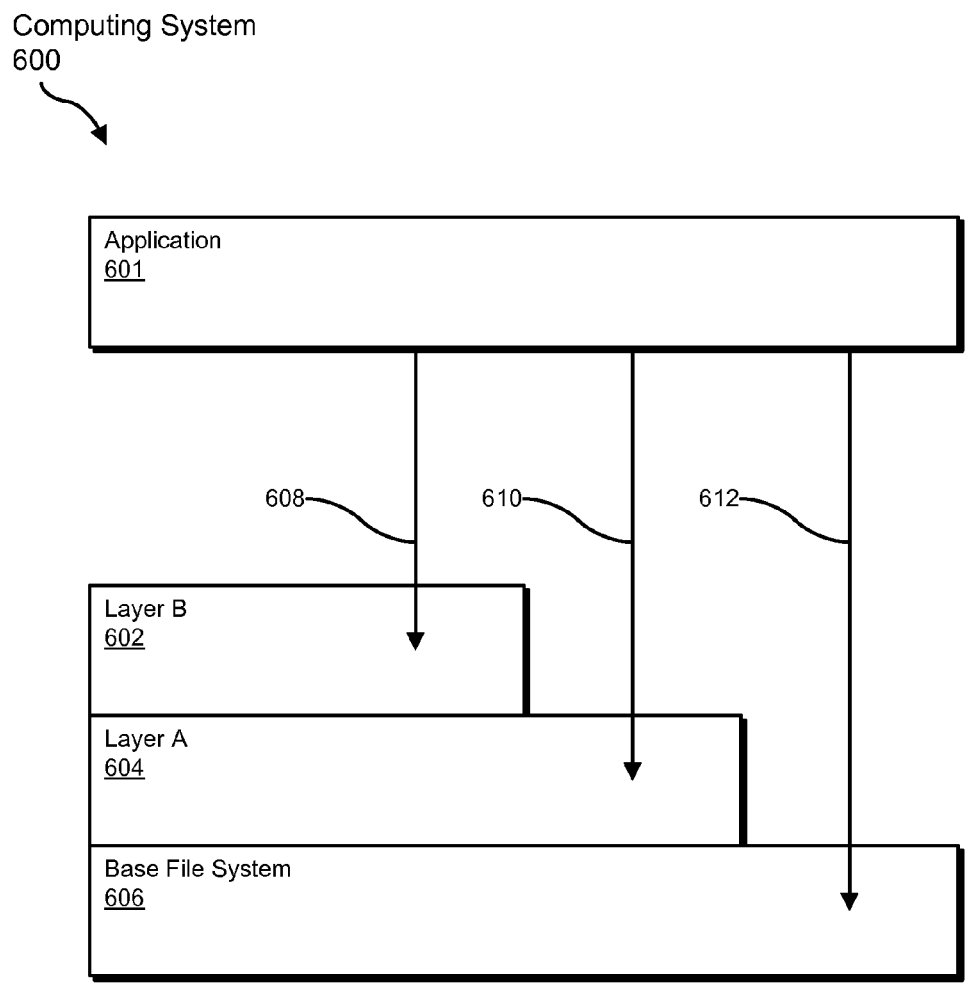
FIG. 6 is a block diagram showing virtualization layer prioritization according to certain embodiments.

FIG. 6 shows the operation of a computing system 600 with multiple virtualization layers. FIG. 6 illustrates an application 601, which may be a first and/or second version of an application. One or more files associated with application 601 may be located on virtualization layer B 602 and/or virtualization layer A 604. Virtualization layer B 602 may have priority over virtualization layer A 604, which in turn may have priority over a base file system 606. Application 601 may operate as follows. A first file access 608 may be made by application 601. A virtualization system may first search in layer B 602 for the requested file. Layer B 602 may include an entry for file access 608, and the corresponding file in layer B 602 may be returned to the application. Since layer B 602 has priority over layer A 604 and base file system 606, even if layer A 604 and base file system 606 have entries that correspond to file access 608, the virtualization system will return the entry from layer B 602.

Application 601 may make another file access 610. The virtualization system may not find a corresponding entry in layer B 602, but may find an entry in layer A 604. A third file access request 612 may not have a corresponding entry in layer B 602 or layer A 604, and the virtualization system may therefore return an entry from base file system 606.

Figure 7:
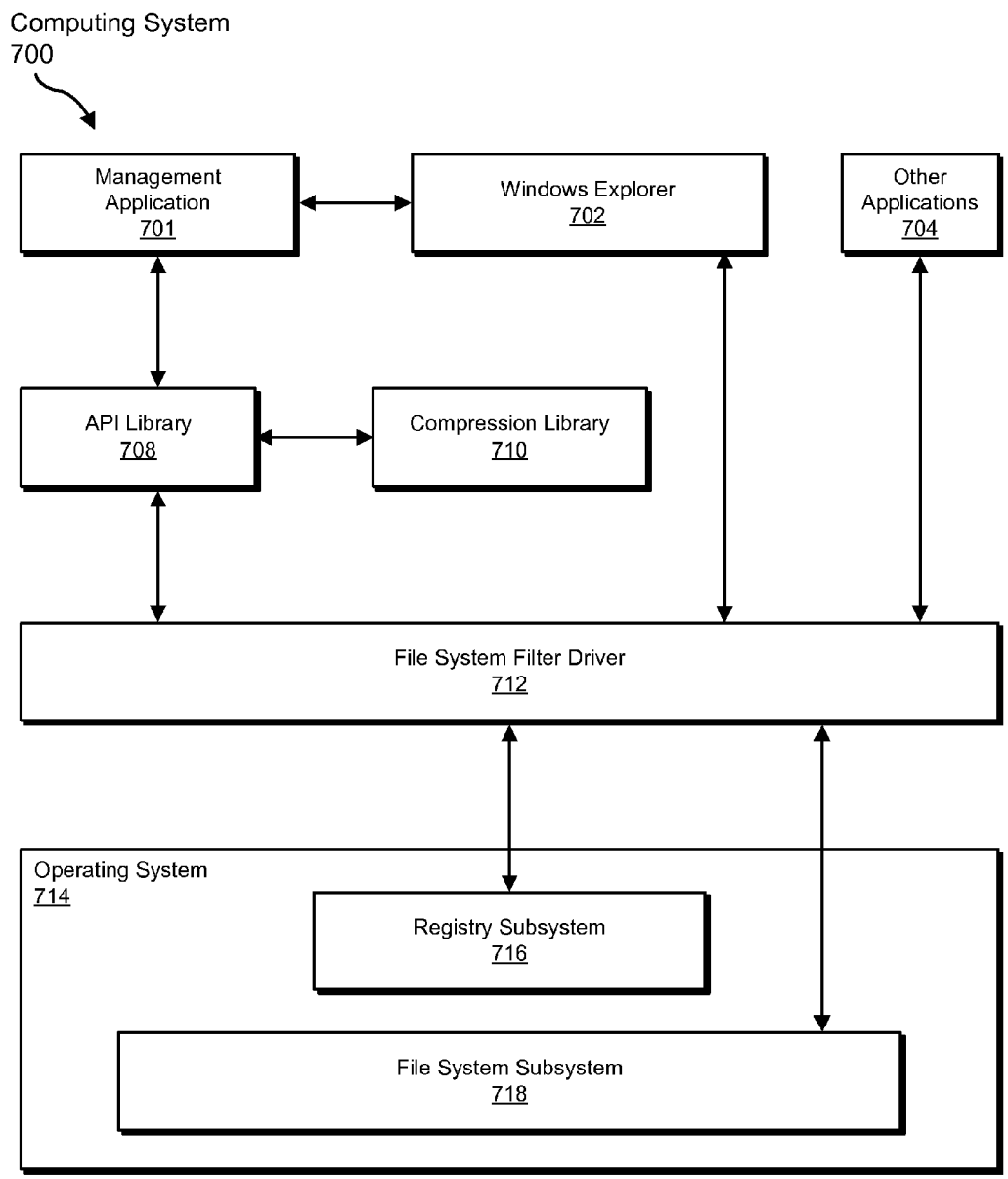
FIG. 7 is a block diagram of components of a computing system that includes virtualization layers according to certain embodiments.

FIG. 7 shows an example of a computing system 700 with a virtualization layer installed. The computing system may include an operating system 714. Operating system 714 may include a registry subsystem 716 and a file system subsystem 718. A file system filter driver 712 may be installed on operating system 714 and may have first processing priority for registry and file system accesses. A management application 701 may provide an administrator with an interface to interact with file system filter driver 712 and make changes to layers. An API library 708 may provide a convenient interface for management application 701 to interface with file system file driver 712.

Management application 701 may provide notices to a WINDOWS EXPLORER 702 indicating that the contents of a mounted file system have been changed. Other applications 704 may interact with the system, performing read and write operations to the file system and registry through file system filter driver 712. A compression library 710 may be provided to compress layer information.

File system filter driver 712 may store components of each layer and sublayer in one of two redirect areas (i.e. areas to which it redirects system calls). For example, file system filer driver 712 may store registry settings and attributes in a registry subsystem 716 and may store files in a file system subsystem 718.

In each sublayer's registry redirection area, file system filter driver 712 may store information about the state of the layer to which the sublayer belongs. File system filter driver 712 may also store references to the sublayer's file redirection area, reference counts, and sub-keys that—through a service control manager—may enable it to handle duplicate services running in multiple layers. In addition, file system filter driver 712 may store references to registry keys that contain user identity information, data-layer specifications, a sub-key for information about exclude entries, and a list of variables that govern the location of layer-specific files. As the name suggests, exclude entries may define application files and processes that a user may want to exclude from layers.

In the root of the file redirection area, file system filter driver 712 may store variable entries that abstract operating system specific file locations to enable users to deploy Virtual Software Archives (VSAs) on computers running various types of operating systems. When file system filter driver 712 is loaded on a user's computer, file system filter driver 712 may determine values for user and system variables.

File system filter driver 712 may store files that comprise sublayers and numbered folders under a file-redirection-area directory. File system filter driver 712 may use registry and file redirection areas to present an operating system—and by extension, applications and users—with an aggregate view of virtualized files and data for activated virtualization layers.

For example, a user may launch WINDOWS EXPLORER to view the contents of a program file folder. The user's machine may be running a virtualized application, such as MOZILLA FIREFOX, and the FIREFOX layer may be activated. While the layer is activated, file system filter driver 712 may intercept EXPLORER's calls to the file system. From the base, which may include all files, settings, and processes that do not reside in layers on the user's machine, file system filter driver 712 may gather a list of non-virtualized applications that reside in the program files folder. File system filter driver 712 may also redirect Explorer's calls to include FIREFOX, which would normally reside in the program files folder but which, in this case, resides in the file redirection area. File system filter driver 712 may then respond to EXPLORER's calls with a complete list of folders that the system expects to see in the program files directory, including FIREFOX. In this example, if the FIREFOX layer were deactivated, file system filter driver 712 would obscure its existence.

Figure 8:
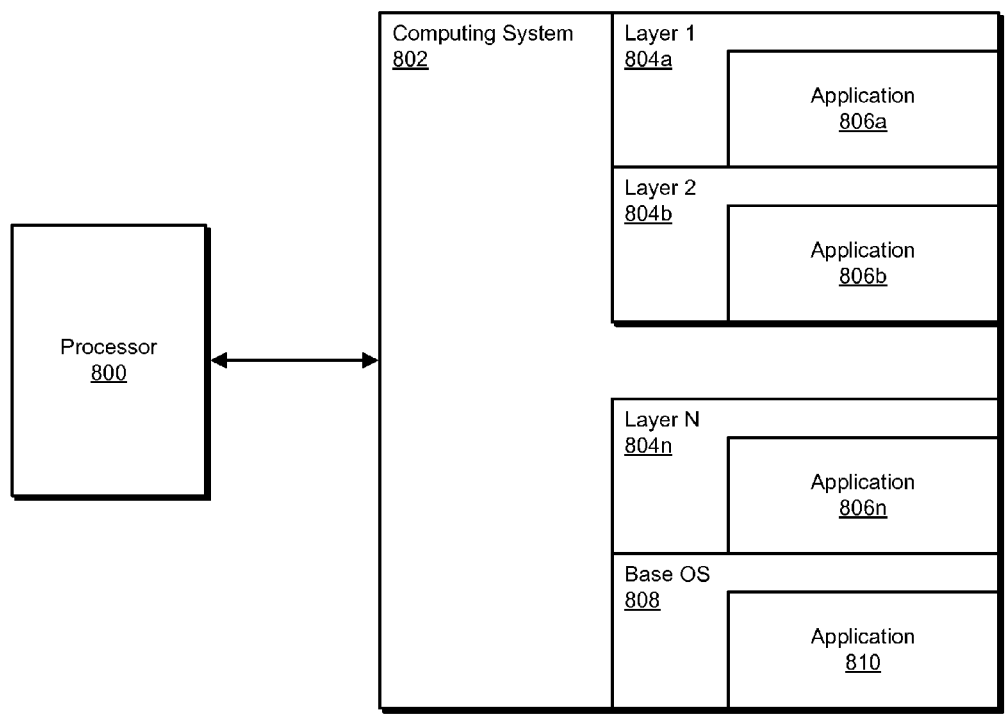
FIG. 8 is a block diagram showing organization of virtualization layers on a computing system according to certain embodiments.

FIG. 8 illustrates an example of a computing system 802 that includes virtualized applications 806a-n. Computing system 802 may contain a number of layers 804a-n. Applications 806a-n may be installed on layers 804a-n, respectively. As referred to herein, a layer (or virtualization layer) may refer to a set of file system and registry changes that may be managed by application virtualization software. In some embodiments, a layer may contain changes to one or more file systems but may not contain registry changes.

A layer may isolate an application from a base file system and may include files and a directory structure of the application's installation. The application files and directories may be shadowed or overlaid over the regular file system. Shared libraries (such as DLLs), system accessible configuration (such as registry entries), and version control may be managed by a layering subsystem.

Though each layer may be a separate and individual entity within a computing system, the application files, data, and system-accessible configuration may be presented as though they resided in their respective ordinary locations. Thus, an application stored in a layer may appear to the operating system of a computing system as if it had been installed using traditional installation techniques.

A software application installed in a virtualization layer may be an application in any commonly used meaning, including word processors, browsers, system tools, games, and the like, and the principles described herein may also extend to any other software installed on a computing system.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the identifying, determining, changing, activating, deactivating, tracking, terminating, detecting, adding, and removing steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the steps or features described and/or illustrated herein, such as identifying, determining, changing, activating, deactivating, tracking, terminating, detecting, adding, and removing.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for identifying, determining, changing, activating, deactivating, tracking, terminating, detecting, adding, and removing steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the identifying, determining, changing, activating, deactivating, tracking, terminating, detecting, adding, and removing steps disclosed herein. Communication interface 922 may also be used to perform and/or be a means for performing other steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the identifying, determining, changing, activating, deactivating, tracking, terminating, detecting, adding, and removing steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Storage devices 932 and 933 may also be used, for example, to perform and/or be a means for performing, either alone or in combination with other elements, one or more of the identifying, determining, changing, activating, deactivating, tracking, terminating, detecting, adding, and removing steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or to run certain software applications. Network 1050 generally represents any telecommunication or computer network; including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the identifying, determining, changing, activating, deactivating, tracking, terminating, detecting, adding, and removing steps disclosed herein. Network architecture 1000 may also be used to perform and/or be a means for performing other steps and features set forth in the instant disclosure.

As detailed above, computing system 910 and/or one or more of the components of network architecture 1000 may perform and/or be a means for performing, either alone or in combination with other elements, one or more steps of the exemplary methods described and/or illustrated herein. For example, a computing system (e.g., computing system 910 and/or one or more of the components of network architecture 1000) may perform a computer-implemented method for activating and deactivating virtualization layers. For example, the computing system may identify an action associated with a software program. The computing system may determine that the software program is located in a virtualization layer. The computing system may also change an activation state of the virtualization layer in response to the action.

In some embodiments, the computing system may identify the action by identifying a request to access the software program. The computing system may change the activation state of the virtualization layer by activating the virtualization layer. In at least one embodiment, the computing system may identify the request to access the software program by identifying an attempt to access a computer resource. The software program may enable the use of the computer resource.

In some embodiments, the computing system may identify the attempt to access the computer resource by identifying a request to open a file, identifying a request to print the file, and/or identifying a request to modify the file. In certain embodiments, the computing system may identify the attempt to access the computer resource by identifying an attempt to use an input device. The software program may enable the use of the input device. The computing system may identify the attempt to access the computer resource by identifying an attempt to use an output device. The software program may enable the use of the output device. The computing system may also identify the attempt to access the computer resource by identifying an attempt to access a network. The software program may enable access to the network.

In at least one embodiment, the computing system may identify the request to access the software program by identifying an attempt to open the software program. In some embodiments, the computing system may identify the action by identifying an attempt to close the software program. The computing system may identify the action by identifying an attempt to close a computer resource. The software program may enable the use of the computer resource. The computing system may also identify the action by identifying termination of a process associated with the software program. In certain embodiments, changing the activation state of the virtualization layer may include deactivating the virtualization layer.

In other embodiments, the computing system may cause, after the virtualization layer is deactivated, an icon associated with the software program to be displayed for a file associated with the software program. In at least one embodiment, the computing system may determine that the software program is located in the virtualization layer by determining that a file type associated with the software program is in a list associated with the virtualization layer. In some embodiments, the computing system may identify the action associated with the software program by identifying an attempt to open a file having a first MIME type. The computing system may also determine that the file type associated with the software program is in the list associated with the virtualization layer by determining that the list includes the first MIME-type.

In some embodiments, the computing system may track a process associated with the software program. The computing system may determine that the software program is no longer in use. The computing system may also terminate the process associated with the software program. The computing system may further change the activation state of the virtualization layer by deactivating the virtualization layer after terminating the process associated with the software program.

In other embodiments, the computing system may identify an attempt to open a file. The computing system may determine that a file type of the file is associated with a virtualization layer. The virtualization layer may comprise a software application capable of opening the file. The computing system may also activate the virtualization layer to enable the software application to open the file. In at least one embodiment, the computing system may track each process associated with the software application. The computing system may determine that the software application is no longer in use. The computing system may also terminate each process associated with the software application. The computing system may further deactivate the virtualization layer after terminating each process associated with the software application. In certain embodiments, the computing system may determine that the software application is no longer in use by detecting that the software application is closed.

In certain embodiments, a computing system may include a layer-management module. The layer-management module may identify an action associated with a software program. The layer-management module may determine that the software program is located in a virtualization layer and may change an activation state of the virtualization layer in response to the action. The computing system may also include a processor configured to execute the layer-management module.

In some embodiments, the computing system may include a database. The database may comprise a list that identifies file types that may be opened with software installed in the virtualization layer. The action associated with the software program may include an attempt to open a file. The software program may be configured to open the file. The layer-management module may determine that a file type of the file is in the list associated with the virtualization layer. The layer-management module may maintain the list that identifies file types by adding at least one entry to the list when software associated with the file type is installed in the virtualization layer, and/or by removing at least one entry from the list when software associated with the file type is removed from the virtualization layer.

In some embodiments, the computing system may include a tracking module in communication with the layer-management module. The tracking module may track a process associated with the software program. The tracking module may also determine that the software program is no longer in use. The tracking module may further terminate the process associated with the software program. The layer-management module may deactivate the virtualization layer after the tracking module terminates the process associated with the software program. In at least one embodiment, the layer-management module may change the activation state of the virtualization layer by activating and/or deactivating the virtualization layer.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

I claim:

1. A computer-implemented method comprising:
   identifying an action associated with a software program by identifying a request to access a file;
   maintaining a list that associates a virtualization layer with a file type;
   determining that the software program is located in the virtualization layer by checking the list that associates the virtualization layer with the file type and determining, based on the list, that a file type of the file is associated with the virtualization layer;
   changing an activation state of the virtualization layer in response to the action, wherein the identifying, the maintaining, the determining, and the changing are performed by a layering computing system.

2. The computer-implemented method of claim 1, wherein:
   identifying the action comprises identifying a request to access the software program;
   changing the activation state of the virtualization layer comprises activating the virtualization layer.

3. The computer-implemented method of claim 2, wherein:
   identifying the request to access the software program comprises identifying an attempt to access a computer resource;
   the software program enables use of the computer resource.

4. The computer-implemented method of claim 3, wherein identifying the attempt to access the computer resource comprises identifying a request to print the file.

5. The computer-implemented method of claim 3, wherein identifying the attempt to access the computer resource comprises at least one of:
   identifying an attempt to use an input device, wherein the software program enables use of the input device;
   identifying an attempt to use an output device, wherein the software program enables use of the output device.

6. The computer-implemented method of claim 2, further comprising:
   installing the software program to the virtualization layer;
   adding at least one entry to the list when the software program is installed to the virtualization layer, wherein:
   the entry identifies a file type associated with the software program;
   the entry associates the file type with the virtualization layer.

7. The computer-implemented method of claim 1, wherein:
   identifying the action comprises at least one of:
      identifying an attempt to close the software program;
      identifying an attempt to close a computer resource, wherein the software program enables use of the computer resource;
      identifying termination of a process associated with the software program;
   changing the activation state of the virtualization layer comprises deactivating the virtualization layer.

8. The computer-implemented method of claim 7, further comprising:
   after the virtualization layer is deactivated, causing an icon associated with the software program to be displayed for a file associated with the software program instead of allowing an operating system to cause the icon to revert to a generic icon, wherein the causing is performed by the layering computing system.

9. The computer-implemented method of claim 1, wherein determining, based on the list, that a file type of the file is associated with the virtualization layer comprises determining that the virtualization layer needs to be activated to allow the file to be opened.

10. The computer-implemented method of claim 9, wherein:
   identifying the action associated with the software program comprises identifying an attempt to open a file having a first MIME type;

determining that the file type associated with the software program is in the list associated with the virtualization layer comprises determining that the list includes the first MIME type.

11. The computer-implemented method of claim 1, further comprising:
tracking a process associated with the software program;
determining that the software program is no longer in use;
terminating the process associated with the software program, wherein changing the activation state of the virtualization layer comprises deactivating the virtualization layer after terminating the process associated with the software program, wherein the tracking, the determining that the software program is no longer in use, and the terminating are performed by the layering computing system.

12. The computer-implemented method of claim 1, tangibly embodied as non-transitory computer-executable instructions on at least one computer-readable-storage medium, wherein the method automatically activates and deactivates virtualization layers on an as-needed basis.

13. A computer-implemented method comprising:
maintaining a list that associates a virtualization layer with a file type;
identifying an attempt to open a file;
determining that a file type of the file is associated with the virtualization layer by checking the list that associates the virtualization layer with the file type and determining, based on the list, that a file type of the file is associated with the virtualization layer, the virtualization layer comprising a software application capable of opening the file;
activating the virtualization layer to enable the software application to open the file, wherein the maintaining, the identifying, the determining, and the activating are performed by a layering computing system.

14. The computer-implemented method of claim 13, further comprising:
tracking each process associated with the software application;
determining that the software application is no longer in use;
terminating each process associated with the software application;
deactivating the virtualization layer after terminating each process associated with the software application, wherein the tracking, the determining that the software application is no longer in use, the terminating, and the deactivating are performed by the layering computing system.

15. The computer-implemented method of claim 14, wherein determining that the software application is no longer in use comprises detecting that the software application is closed.

16. The computer-implemented method of claim 14, tangibly embodied as computer-executable instructions on at least one computer-readable-storage medium.

17. A system comprising:
a layer-management module programmed to automatically change an activation state of a virtualization layer by:
identifying an action associated with a software program;
determining that the software program is located in the virtualization layer;
changing an activation state of the virtualization layer in response to the action;
one or more processors configured to execute the layer-management module;
a database comprising a list that identifies file types that may be opened with software installed in the virtualization layer, wherein:
the action associated with the software program comprises an attempt to open a file;
the software program is configured to open the file;
the layer-management module is programmed to determine that a file type of the file is in the list associated with the virtualization layer;
the layer-management module is programmed to maintain the list that identifies file types.

18. The system of claim 17,
the layer-management module is programmed to maintain the list that identifies file types by:
adding at least one entry to the list when software associated with the file type is installed in the virtualization layer;
removing at least one entry from the list when software associated with the file type is removed from the virtualization layer.

19. The system of claim 17, further comprising a tracking module in communication with the layer-management module and programmed to:
track a process associated with the software program;
determine that the software program is no longer in use;
terminate the process associated with the software program, wherein the layer-management module is programmed to deactivate the virtualization layer after terminating the process associated with the software program.

20. The system of claim 17, wherein the layer-management module is programmed to change the activation state of the virtualization layer by activating and deactivating the virtualization layer.

* * * * *

UNITED STATES PATENT AND TRADEMARK OFFICE
CERTIFICATE OF CORRECTION

| | | |
|---|---|---|
| PATENT NO. | : 8,612,994 B1 | Page 1 of 1 |
| APPLICATION NO. | : 12/414170 | |
| DATED | : December 17, 2013 | |
| INVENTOR(S) | : Jordan Sanderson | |

It is certified that error appears in the above-identified patent and that said Letters Patent is hereby corrected as shown below:

In the Claims

Claim 18, at column 20, line 30, should read:

The system of claim 17, wherein:

Signed and Sealed this
Thirteenth Day of May, 2014

Michelle K. Lee
*Deputy Director of the United States Patent and Trademark Office*